United States Patent [19]

Hunt

[11] 4,220,692
[45] Sep. 2, 1980

[54] INTERNAL GEOMETRY OF ALKALI METAL THERMOELECTRIC GENERATOR DEVICES

[75] Inventor: Thomas K. Hunt, Ann Arbor, Mich.

[73] Assignee: Ford Motor Company, Dearborn, Mich.

[21] Appl. No.: 16,240

[22] Filed: Feb. 28, 1979

[51] Int. Cl.² ............................................. H01M 4/36
[52] U.S. Cl. ..................................... 429/104; 429/112
[58] Field of Search .................. 429/11, 101, 104, 112

[56] References Cited

U.S. PATENT DOCUMENTS 4,170,694  10/1979  Chase et al. ..................... 429/104 X Primary Examiner—Leland A. Sebastian
Attorney, Agent, or Firm—Edmund C. Ross, Jr.; Olin B. Johnson

[57] ABSTRACT

Electrolyte geometry in alkali metal thermoelectric generator devices that alters the view thereof seen by cooler condenser regions provides an increase in power generating area without undesirably concomitant increase in radiation heat transfer area.

2 Claims, 5 Drawing Figures

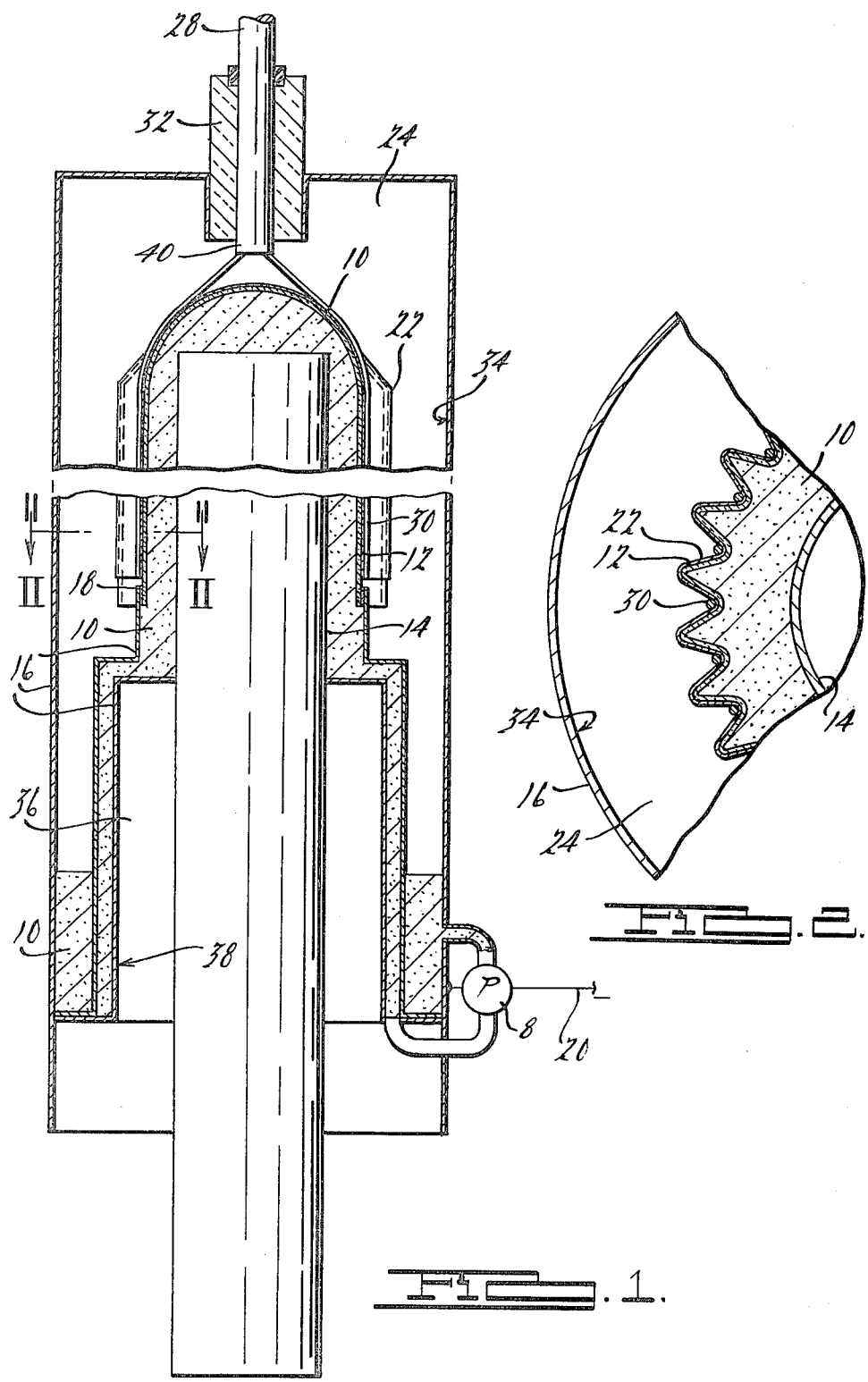

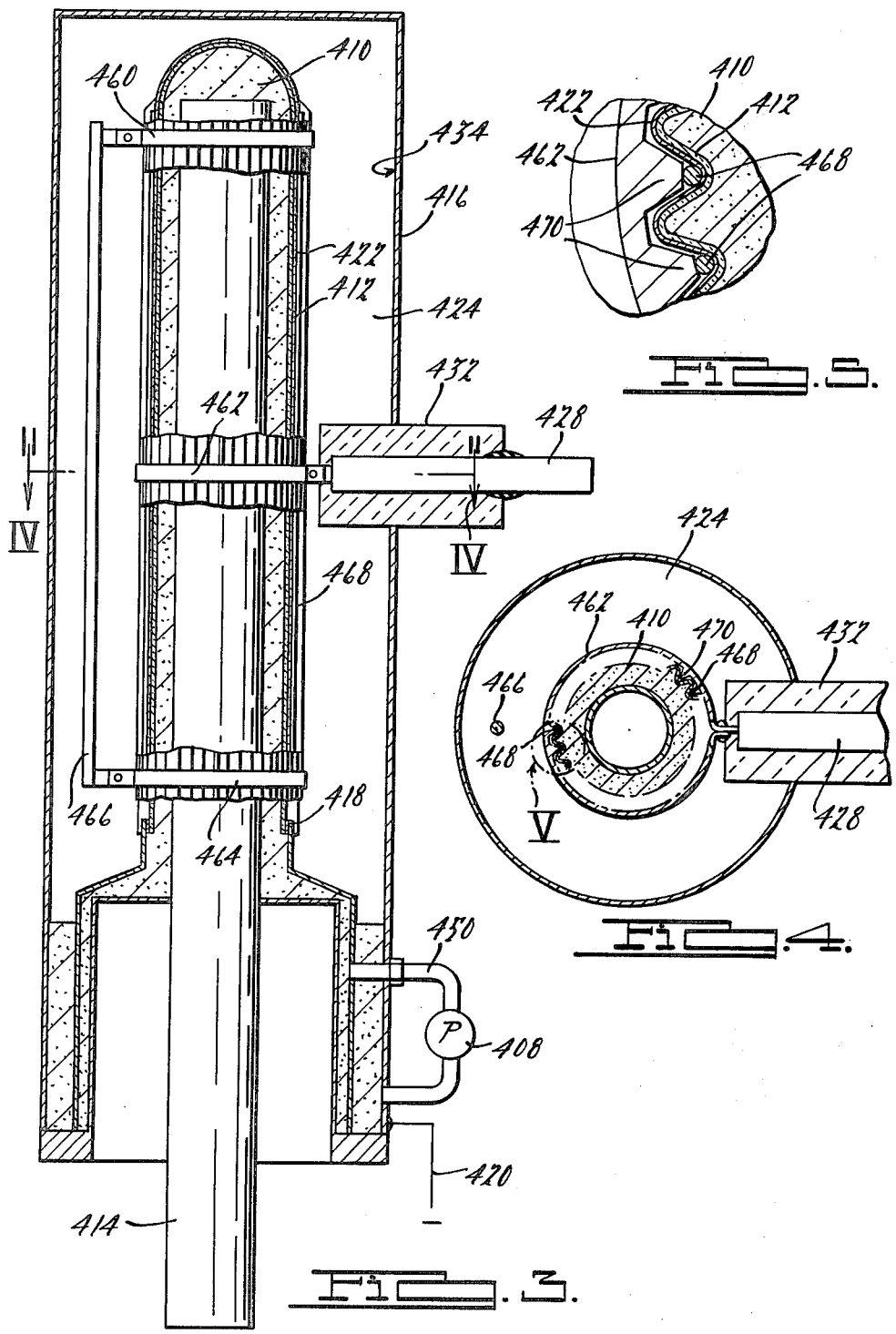

INTERNAL GEOMETRY OF ALKALI METAL THERMOELECTRIC GENERATOR DEVICES

BACKGROUND OF THE INVENTION

Alkali metal thermoelectric generators are devices that convert heat directly to electricity by the electrochemical expansion of alkali metal. These devices and their mode of operation have been described heretofore (see, for example, U.S. Pat. Nos. 3,458,356; 3,511,715; 3,535,163; 4,042,757; 4,049,877; 4,098,958 and U.S. Ser. No. 894,969 filed June 10, 1978, now U.S. Pat. No. 4,175,164, as well as publications, "Output Power and Efficiency For a Sodium Thermoelectric Heat Engine" by Hunt et al (inventor herein), Energy 10, Pt. II, 231, 1975 "A Thermoelectric Device Based on Beta-Alumina Solid Electrolyte"Weber pp 1–8, Pergamon Press, 1974).

The relation in such thermoelectric generators between the output current and voltage at an upper operating temperature $T_2$ has been previously approximated as:

$$V = \frac{RT_2}{F} \ln \frac{(P_2)}{(P_1 + \delta(i))} - iR_o \qquad \text{Eq. (1)}$$

where R is the gas constant $8.32 \times 10^3$ J/mole K; F is the Faraday $= 9.652 \times 10^7$ coul/mole; $P_2$ and $P_1$ are the vapor pressures of alkali metal as sodium at the upper $T_2$ and lower $T_1$ operating temperatures respectively; $\delta(i)$ is the effective pressure due to the current i; and $R_o$ is the internal resistance. Also previously derived is an approximate mathematical expression for the efficiency which may be written as:

$$\eta = \frac{iV}{iV + \frac{i}{F}(L + \Delta H) + \frac{\sigma}{Z}(T_2^4 - T_1^4) + K(T_2 - T_1)} \qquad \text{Eq. (2)}$$

where L is the latent heat of vaporization for alkali metal: $\Delta H$ is the change in enthalpy of the alkali metal as it is heated from $T_1$ back up to $T_2$, $\sigma$ is the Stefan-Boltzmann constant; Z is the factor by which radiative transfer of heat from the hot electrode surface at $T_2$ to the cold condenser surface at $T_1$ is reduced by the reflectivity of the condenser and the emissivity of the electrode surface; and K is the effective thermal conductance of the electrical leads which bring the power from $T_2$ to the outside at $T_1$.

In Equation (2), all of the terms, losses and power output, are per unit area and, accordingly, generally increase or decrease linearly with the active surface area of the device when the electrode-electrolyte surface and the condenser surface are parallel to each other.

The first two terms in the denominator in Equation (2) are inherent to the operation of the device while the third and fourth terms represent parasitic losses. Of these the third or radiation term is very important and the losses can be substantial even with relatively high values for Z.

It is important for desired operation of the devices that neutral alkali metal atoms be able to transmit freely from porous electrode to condenser in numbers adequate to account for the output current of the device. If one attempts to reduce the radiation loss by interposing a "radiation shield" (see, for example, U.S. Pat. No. 4,098,698) between electrode and condenser, the result may include an increase in the pressure $P_1$ (Equation (1)) and a consequent decrease in the operating voltage with, if no other changes are made, a loss in specific power output. If, on the other hand, the device size is merely increased while the parallel and unobstructed electrode-condenser geometry is maintained, the total output power will increase but the losses due to radiation and conduction will also increase in direct proportion since the area which radiates will correspondingly be increased (Equation 2).

BRIEF DESCRIPTION OF THE DRAWINGS

FIGS. 1 and 2 illustrate one embodiment of this invention in representative vertical and horizontal views, respectively. FIG. 1 shows a heat pipe surrounded in part by solid, uniformly thick, electrolyte tube that is further surrounded by a tubular condenser. FIG. 2 illustrates corrugated electrolyte of FIG. 1.

FIGS. 3, 4 and 5 illustrate a second enbodiment of this invention again in horizontal and vertical views.

THE INVENTION

This invention relates to thermoelectric generator devices with increased efficiency by means of certain internal geometry and, includes, in particular, such devices designed to maximize the area for power generation while minimizing the normally concomitant heat radiating area that is seen by cooler regions within the device.

As distinguished from a smooth surface electrolyte membrane having a hot active electrode area and an equal concomitant area for radiation to the cooler condenser surface, in this invention the same hot active electrode area by virtue of its undulations, corrugations or otherwise textured surface presents to the view of the cooler condenser surface a substantially smaller effective area for radiative heat transfer. Thus, radiative transfer losses are reduced in importance relative to output power and device efficiency. enhanced in accordance with Equation (2).

This expedient, altering the "view" of the hot electrolyte seen by the cooler condenser thus allows packing more electrolyte-electrode surface into thermoelectric generator devices without incurring usual detriment of increased emissive area for radiative heat loss.

For still further improvement in efficiency, a buss system is provided in preferred embodiments that reduces loss in efficiency that may occur due to insufficient electron transport on porous electrodes in larger devices of this invention.

DETAILED DESCRIPTION OF THE INVENTION

FIGS. 1 and 2 illustrate one embodiment of this invention wherein the middle portion of the electrolyte tube with electrode thereon is corrugated.

In FIG. 1, operation of the device may be understood by first referring to the molten alkali metal 10 which in this case is sodium in an annular region included between electrolyte tube 12 (made desirably of uniformly thick beta alumina) and heat pipe 14. Metal can 16 comprises three concentric tubular members which serve to contain alkali metal 10 after condensation and before electrochemical expansion. Electrolyte tube 12 is sealed to the middle concentric member of metal can 16 at metal to ceramic seal 18 made of standard "active metal" braze, as is known in the art.

Particular attention in making the seal 18 is directed to (1) close tolerance fits, (2) matching of thermal expansion coefficients of mating parts, (3) use of ductile metals in matching the rigid ceramic electrolyte to the metal can, and (4) cleanliness and uniform heating during brazing.

Alkali metal as sodium 10, heated by heat pipe 14 or other heating means, travels in cationic form through corrugated, ceramic electrolyte 12 while giving off an electron that passes to electrode 20 (which can, as shown, be integral with the electrical lead of an electromagnetic pump). The alkali metal cations pass through the electrolyte 12 and receive electrons from porous electrode 22 (shown proportionally larger than actual size for illustration) on the surface of electrolyte 12. Electrode 22 can be made of suitable metal as molybdenum or the like and is about 1-10 micrometers in thickness. Electrode 22 connects to the external circuit through a buss system (more completely explained and illustrated hereinafter (FIG. 2) and which includes buss conducting wires 30 together with buss wire harness 40 that conveys electrons from exit lead 28. Insulator 32 electrically insulates exit lead 28 from the metal can 16. Alkali metal ions, having recombined with electrons at porous electrode 22, are neutralized and as neutral atoms evaporate therefrom and pass through essentially vacuum space 24 to condenser surface 34 (of can 16) that is maintained at least about 100° C. below the temperature of porous electrode 22. Alkali metal collects on condenser surface 34 and drains to the bottom of the device whereupon it is pumped into the hotter zone again by pump 8. Insulating space 36 between heat pipe 14 and inner most side 38 of metal can 16 at its lower portion serves to reduce heat loss from heat pipe 14.

Electrolyte 12 with electrode 22 thereon is corrugated so as to reduce radiation loss area relative to thermoelectric generating area. FIG. 2 is an illustrative showing of such corrugation and it is a sectional taken around II—II of FIG. 1.

In FIG. 2 there can be seen corrugated electrolyte 12, liquid alkali metal 10, heat pipe 14 and surface of condenser 34. Also, buss wires 30 are seen in this embodiment as fitting in corrugation valleys and in contact with porous electrode 22 but may be placed in contact with porous electrode otherwise. The buss wires 30 extend to harness 40 as shown in FIG. 1. The buss wires and harness are made of suitable temperature resistant metal as copper or molybdenum and fit against porous electrode 22 to insure adequate transport of electrons to the electrolyte surface.

FIG. 3 illustrates still another embodiment of this invention with supplementary buss bar system. In this embodiment, the exit lead is radial as compared to the axial exit lead of FIG. 1.

In FIG. 3, the thermoelectric generator device again is concentric with metal as steel can 416 with condenser surface 434 surrounding corrugated ceramic electrolyte 412 (made of beta alumina) which in turn surrounds molten alkali metal 410 and heat pipe 414. In this embodiment, the condenser surface 434 is a material as copper electroplate that aids in wetting by the condensing alkali metal as sodium. The sodium wetted surface serves to reflect radiant energy from the colder toward the hotter region comprising corrugated electrolyte with electrode thereon.

Molten alkali metal as sodium 410 is heated by heat pipe 414 and travels in ionic form through ceramic electrolyte 412 where it recombines with electrons at porous electrode 422 and evaporates into evacuated zone 424 and collects on cooler condenser surface 434 of metal can 416. The alkali metal drains down condenser surface 434 and is collected at the bottom region of the device whereupon it is pumped through conduit 450 by pump 408 which may be electromagnetic or other pumping means whereupon it is heated again to temperatures of at least about 600° C. or higher as about 800°–1200° C. by heat pipe 414.

Negative lead 420 makes electrical contact with metal can 416 and conducts from the device electrons released by ionization of alkali metal.

In FIG. 4 positive output lead 428, insulated by insulator 432, serves to conduct electrons from the external circuit to the porous electrode 422 via buss strap 462 (and buss straps 460 and 464, similarly, see FIG. 3), supplemental buss wire 466 and buss wires 468.

FIGS. 4 and 5 show corrugated electrolyte 412, buss wires 468, and buss strap 462. Buss strap 462 comprises teeth 470 that press buss wires 468 into contact with porous electrode 422. Supplemental buss 466 reduces longitudinal resistance of buss wire system.

Buss clamps 460, 462, 464 as well as buss wires 468 and supplemental buss bar 466 all are made of suitable highly conductive metal as molybdenum or copper.

It is to be understood then that this invention permits increase of power generating area of theremoelectric generator devices by increasing electrolyte surface through corrugations, undulations or other texturing in the electrolyte while at the same time not increasing correspondingly the area by which radiative heat transfers to cooler regions within the device. The dimension and form of the texturing can be varied widely and, in general, are a function of manufacturing expedience that takes into consideration that the electrolyte is in most instances desirably uniformly thick and as thin as is consistent with desired structural integrety. One method of making textured electrolytes is by molding as by extrusion set forth in U.S. Ser. No. 810,464 filed June 27, 1977 in the name of Pett et al (which is hereby herein incorporated by reference) particularly the examples as example 19.

What is claimed is:

1. In an alkali metal thermoelectric generator device that converts heat energy directly to electrical energy by electrochemical expansion of alkali metal across an electrolyte membrane having a porous electrode thereon that serves to transport electrons for recombination with alkali metal cations passing through the electrolyte, the improvement which comprises a porous electrode on textured electrolyte that during operation of the thermoelectric generator device causes at least a portion of energy radiating from a portion of the porous electrode to impinge directly upon another portion of the electrode.

2. The alkali metal thermoelectric generator in accordance with claim 1, wherein the textured electrolyte has the porous electrode thereon in distributed contact with electron transport means.

* * * * *